United States Patent
Cui et al.

(10) Patent No.: US 12,148,419 B2
(45) Date of Patent: Nov. 19, 2024

(54) REDUCING EXPOSURE BIAS IN MACHINE LEARNING TRAINING OF SEQUENCE-TO-SEQUENCE TRANSDUCERS

(71) Applicant: International Business Machines Corporation, Armonk, NY (US)

(72) Inventors: Xiaodong Cui, Chappaqua, NY (US); Brian E. D. Kingsbury, Cortlandt Manor, NY (US); George Andrei Saon, Stamford, CT (US); David Haws, New York City, NY (US); Zoltan Tueske, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/549,006

(22) Filed: Dec. 13, 2021

(65) Prior Publication Data

US 2023/0186903 A1 Jun. 15, 2023

(51) Int. Cl.
*G10L 15/16* (2006.01)
*G06N 3/045* (2023.01)
*G06N 5/04* (2023.01)

(52) U.S. Cl.
CPC .............. *G10L 15/16* (2013.01); *G06N 3/045* (2023.01); *G06N 5/04* (2013.01)

(58) Field of Classification Search
CPC ........... G10L 15/16; G06N 3/045; G06N 5/04
USPC .......................... 704/200, 202, 232, 251, 259
See application file for complete search history.

(56) References Cited

U.S. PATENT DOCUMENTS

| | | | |
|---|---|---|---|
| 10,255,909 B2 | 4/2019 | Hofer et al. | |
| 10,540,962 B1 | 1/2020 | Chan et al. | |
| 10,770,064 B1 | 9/2020 | Graves et al. | |
| 11,315,548 B1 * | 4/2022 | Heikinheimo | G10L 15/065 |
| 2018/0121800 A1 | 5/2018 | Kanda | |

(Continued)

FOREIGN PATENT DOCUMENTS

| | | |
|---|---|---|
| CN | 110689879 A | 1/2020 |
| WO | WO2020/141217 A1 | 7/2020 |

OTHER PUBLICATIONS

Cui, Xiaodong et al., "Reducing Exposure Bias in Training Recurrent Neural Network Transducers", arXiv:2108.10803v1 [cs.CL], Aug. 24, 2021, 5 pages.

(Continued)

*Primary Examiner* — George C Monikang
(74) *Attorney, Agent, or Firm* — Stephen J. Walder, Jr.; Caleb Wilkes

(57) ABSTRACT

Mechanisms are provided for performing machine learning training of a computer model. A perturbation generator generates a modified training data comprising perturbations injected into original training data, where the perturbations cause a data corruption of the original training data. The modified training data is input into a prediction network of the computer model and processing the modified training data through the prediction network to generate a prediction output. Machine learning training is executed of the prediction network based on the prediction output and the original training data to generate a trained prediction network of a trained computer model. The trained computer model is deployed to an artificial intelligence computing system for performance of an inference operation.

20 Claims, 3 Drawing Sheets

(56) References Cited

U.S. PATENT DOCUMENTS

2020/0197818 A1* 6/2020 Ma .................. A63F 13/424
2023/0222353 A1* 7/2023 Lioutas ............. G06N 3/094
706/25

OTHER PUBLICATIONS

Yoon, Jeongmin et al., "Speech-Act Analysis Based on Dialogue Level RNN-CNN Effective on the Exposure Bias Problem", Journal of KIISE 45.9:911-17, KIISE—Korean Institute of Information Scientists and Engineers, Abstract (summary), Sep. 2018, 1 page.

* cited by examiner

REDUCING EXPOSURE BIAS IN MACHINE LEARNING TRAINING OF SEQUENCE-TO-SEQUENCE TRANSDUCERS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "Reducing Exposure Bias in Training Recurrent Neural Network Transducers", Xiaodong Cui, Brian Kingsbury, George Saon, David Haws, Zoltan Tuske, arXiv:2108.10803v1 [cs.CL], Aug. 24, 2021.

BACKGROUND

The present application relates generally to an improved data processing apparatus and method and more specifically to mechanisms for reducing exposure bias in training recurrent neural network transducers.

Sequence-to-sequence transducers are mechanisms used in artificial intelligence (AI) systems to take an input sequence and transform the input sequence into an output sequence. An example of a sequence-to-sequence transducer that utilizes a recurrent neural network (RNN) architecture and has been used in AI systems, such as automatic speech recognition (ASR) systems, is referred to as a recurrent neural network transducer (RNNT). In the domain of an ASR system, the RNNT provides an end-to-end architecture that directly maps acoustic feature sequences to text token sequences.

These sequence-to-sequence transducers are trained through machine learning training processes to predict an output sequence given an input sequence. Machine learning is an important component of the growing field of data science. Through the use of statistical methods, computer models are trained to make classifications or predictions, uncovering key insights within data mining projects. These insights subsequently drive decision making in various industries.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, for performing machine learning training of a computer model is provided. The method comprises generating, by a perturbation generator, a modified training data comprising perturbations injected into original training data by the perturbation generator, where the perturbations cause a data corruption of the original training data. The method further comprises inputting the modified training data into a prediction network of the computer model and processing the modified training data through the prediction network to generate a prediction output. The method further comprises executing machine learning training of the prediction network based on the prediction output and the original training data to generate a trained prediction network of a trained computer model. In addition, the method comprises deploying the trained computer model to an artificial intelligence computing system for performance of an inference operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
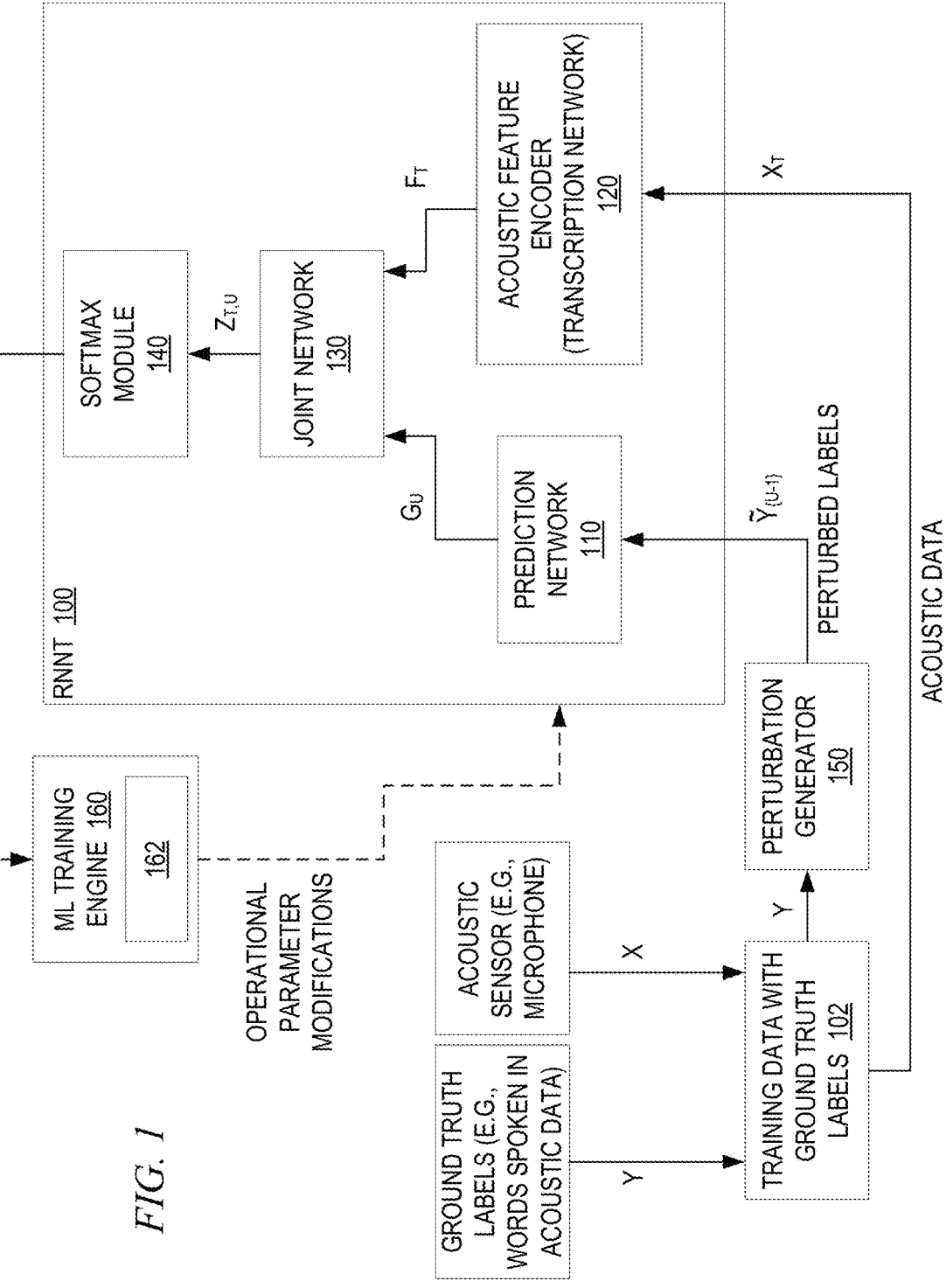
FIG. 1 is an example block diagram of a perturbation generator enhance recurrent neural network transducer (RNNT) architecture in accordance with one illustrative embodiment.

When sequence-to-sequence (Seq2Seq) transducers, such as RNNTs, are trained by machine learning training processes, such as using a maximum likelihood criterion, the computer model, or prediction network, such as a RNN, is trained only on ground truth label sequences, where the labels specify the correct answers that the computer model should generate if operating properly and is used to adjust operational parameters to reduce error or loss in the output of the computer model. This reliance on ground truth labels to train the computer model leads to a mismatch between the performance of the computer model during training, and the operation of the trained computer model during runtime operation, also referred to as during "inference" where the computer model infers an output sequence from an input sequence, when the trained computer model must deal with input sequences containing unseen sequences in the training data. This mismatch is referred to as "exposure bias."

The illustrative embodiments provide an improved computing tool and improved computing tool operations that operate to reduce exposure bias in machine learning training of computer models, such as Seq2Seq computer models, an example of which is an RNNT, and thereby provide improved performance of the computer model during inference stage operations. For purposes of illustration herein, example illustrative embodiments will assume that the computer model is a RNNT model implemented in an artificial intelligence (AI) computer system specifically configured to perform automatic speech recognition (ASR). These examples for illustrative purposes only and it should be appreciated that the present invention is not limited to these examples. To the contrary, the mechanisms of the illustrative embodiments may be implemented with, and may improve the operations of, any Seq2Seq computer model of various architectures, operating to perform sequence-to-sequence transformations in various domains and for various purposes other than automatic speech recognition. In some illustrative embodiments, the computer model may be part of various types of end-to-end transducer based systems including, but not limited to, a Conformer model based system, systems that involve transduction in language modeling or machine translation, or the like.

The mechanisms of the illustrative embodiments cause a label-preserving input perturbation to be introduced into the computer model, where "label-preserving" refers to the property that the original ground truth labels are still used in the loss function of the machine learning training of the computer model even though they perturbed input is used by the prediction network. Again, the "labels" in this case are the correct outputs of the computer model should the computer model be operating properly and generating correct outputs, e.g., if the input comprises an acoustic data input with a corresponding set of "labels", the labels may be the actual correct textual words that were spoken and are part of the acoustic data input. With this label-preserving input perturbation, input token sequences are perturbed during machine learning training of the computer model, e.g., RNNT, using a scheduled sampling technique based on an additional token language model, or other data corruption mechanism, e.g., a Bernoulli trial can be used to provide random corruption or a model-based mechanism to generate labels that are hypotheses to the ground truth labels. This mechanism has been shown to reduce exposure bias in the computer model which further improves the accuracy during inference stage operations.

As noted above, the description of the illustrative embodiments will assume, for purposes of illustration only, that the computer model, such as a recurrent neural network (RNN) transducer, operates to perform automatic speech recognition operations for an artificial intelligence (AI) computing system, such as an end-to-end (E2E) automatic speech recognition (ASR) system. E2E ASR systems have become increasingly dominant in modern ASR. Compared to hybrid deep neural network (DNN) ASR systems, where output units represent context-dependent Hidden Markov Model (HMM) states, E2E ASR systems directly map an input acoustic sequence to an output text sequence. Therefore, pronunciation, acoustic, and language modeling are carried out in the same framework. E2E ASR computer models also do not require hard frame level alignment, which greatly simplifies the ASR training pipeline. A broad variety of network architectures have been proposed for E2E systems in literature, notably connectionist temporal classification (CTC), attention-based encoder-decoder (AED), recurrent neural network transducer (RNNT), and self-attention-based transformer architectures.

RNNT computer models have emerged as a promising E2E ASR framework. RNNT computer models achieve competitive performance and in the meantime are streaming friendly, i.e. at inference time, the system can recognize input on the fly instead of waiting for an entire utterance to finish before performing inference and thus, provides a better real-time performance. This makes RNNT computer models for ASR systems attractive in real-world deployments.

The illustrative embodiments focus on improving Seq2Seq computer model, and in the example illustrative embodiments, RNNT, performance by reducing exposure bias during machine learning training of the computer model, e.g., through supervised or unsupervised machine learning training operations and corresponding machine learning training logic. Exposure bias, a generic issue in text generation, arises due to the training-generation (inference) discrepancy. Exposure bias happens when training is conducted with ground truth labels, while generation, or inference, is conducted with "errorful" label sequences. In RNNT, the RNN prediction network predicts the next token conditioned on a history of previous tokens. In training, the prediction network is always fed with ground truth label sequences. However, errors may occur in decoding. Therefore, the prediction of the next token is conditioned on a history contaminated with errors. This mismatch in training and decoding gives rise to exposure bias in RNNT computer models and hurts their generalization under test conditions.

Scheduled sampling is a representative technique for mitigating exposure bias. It has been used in E2E ASR frameworks such as AED models and self-attention-based transformers. Given the generative nature of the encoder-decoder architecture, scheduled sampling is relatively straightforward to realize in these frameworks. In RNNT, however, the prediction network essentially provides a "soft" token alignment of the acoustic feature sequence to compute the transition probabilities on the time-token lattice, i.e. a lattice with grids where the horizontal grids represent time while the vertical grids represent label tokens and the alignment is a path through these grids from the bottom left (first time stamp and first label token) to the top right (last time stamp and last label token). Since it is not a generative architecture, conventional scheduled sampling cannot be applied.

Scheduled sampling in the AED models and self-attention-based transformers provides a perturbation of the token history to introduce uncertainty during training. The perturbation is carried out such that the token history on which the next token prediction is conditioned is close to that observed in decoding so that the gap between the two is reduced. However, again, such scheduled sampling is not applicable to sequence-to-sequence (Seq2Seq) transducer models, such as the RNNT architecture.

The illustrative embodiments provide a label-preserving perturbation generator that generates perturbation of input token sequences to the prediction network in the Seq2Seq computer model, e.g., the RNNT, to reduce the exposure bias. Specifically, in some of the illustrative embodiments, an RNNT architecture is provided in which a perturbation generator introduces a perturbation, such as through random corruption of input token sequences, e.g., random corruption based a randomized error generator, a perturbation comprising token corruption based on a token language model (LM), such as through a scheduled sampling from a token language model (LM), a perturbation from decoding hypotheses, e.g., an n-best candidates of ground truth technique, a Bernoulli trial that introduces random corruptions, or the like. These perturbations operate to inject errors into the ground truth labels used to train the Seq2Seq computer model or transducer, e.g., RNNT, such that the ground truth used to train the Seq2Seq transducer is similar to the errorful testing data and/or real-world data operated on during testing and/or runtime inference stages of operation, i.e., after training of the Seq2Seq transducer has been completed. As a result, the trained computer model, e.g., RNNT, will be more tolerant of errors in that it will be trained to generate correct sequence outputs even in the presence of errorful data. In addition, the resulting trained computer model provides improved word error rates (WERs), i.e., lower WERs than prior ASR mechanisms. Prior to the present invention, no mechanisms have been provided to perturb he input to the prediction network of a Seq2Seq transducer and thus, the prediction network causes exposure bias. The illustrative embodiments provide mechanisms to introduce a perturbation to reduce this exposure bias.

For example, in a machine learning operation for a RNNT of an ASR system, the RNNT may be trained using a supervised machine learning training operation based on a data pair (x, y) where x is the acoustic data sampled, for example, from a microphone or other acoustic sensor device, and y is the label of that acoustic data, for example the actual words spoken in the acoustic data. For example, a user may speak the phrase "how are you" and this is the label for the corresponding detected acoustic data sampled from the microphone. By training the RNNT based on both the acoustic data and the label, the RNNT is trained to learn a mapping from the acoustic data x to its text output y. With the mechanisms of the illustrative embodiments, a perturbation generator perturbs the input ground truth label of "how are you" to include a randomized error, e.g., "who are you". This perturbed input is provided to a prediction network of the RNNT while the ground truth label, e.g., "how are you" is still used in the output of the RNNT to perform the machine learning training of the RNNT. In this way, the prediction network is trained to properly process errorful input data.

Before continuing the discussion of the various aspects of the improved computing tool of the illustrative embodiments and the improved computing tool operations performed by the illustrative embodiments, it should be first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments are specifically directed to an improved computing tool and improved computing tool operation that provides specific improvements in the training of sequence-to-sequence (Seq2Seq) computer models, such as recurrent neural network transducers (RNNTs) and other Seq2Seq computer models, used in various artificial intelligence (AI) computer systems, such as automatic speech recognition (ASR) computer systems, language modeling, and machine translation computer systems, as well as any other computer systems that utilize machine learning trained Seq2Seq computer models to perform their AI computer system operations. As will be apparent in view of the present description, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a perturbation generator enhanced Seq2Seq computer model, such as a perturbation generator enhanced RNNT architecture. The improved computing tool implements mechanism and functionality, such as generating perturbations in training data that is used to train the Seq2Seq computer model, which cannot be practically performed by human beings either outside of, or with the assistance of, a technical environment, such as a mental process or the like. The improved computing tool provides a practical application of the methodology at least in that the improved computing tool is able to improve the machine learning training of the Seq2Seq computer model such that there is a reduction in exposure bias with the resulting trained computer model when the trained computer model operates in an inference stage of operation.

It should be appreciated that all of the functions of the illustrative embodiments as described herein are intended to be performed using automated processes without human intervention. While any data operated on may be associated with human beings and human beings may benefit from the operation of the illustrative embodiments, the illustrative embodiments of the present invention are not directed to any actions performed by the patient, but rather logic and functions performed specifically by the improved computing tool. Moreover, even though the present invention may provide an output that may be used as a basis for other artificial intelligence operations that may ultimately assist human beings with decision making, the illustrative embodiments of the present invention are not directed to actions performed by the human being as a result of the processing performed by the artificial intelligence computer system, but rather to the specific operations performed by the specific improved computing tool of the present invention which facilitates the machine learning training of the computer model in an improved manner. Thus, the illustrative embodiments are not organizing any human activity, but are in fact directed to the automated logic and functionality of an improved computing tool.

FIG. 1 is an example block diagram of a perturbation generator enhanced recurrent neural network transducer (RNNT) architecture in accordance with one illustrative embodiment. It should be appreciated that the architecture shown in FIG. 1 is only an example of one type of sequence-to-sequence (Seq2Seq) computer model that may be enhanced with a perturbation generator of the illustrative embodiments and is provided only for illustrative purposes. It should be appreciated that the illustrative embodiments may be implemented with other computer model architectures other than an RNNT architecture without departing from the spirit and scope of the illustrative embodiments. Moreover, it should be appreciated that the logic and functionality attributed to the elements shown in FIG. 1 may be provided as one or more improved computing tools whose functionality is specifically configured to perform the operations described herein in an automated manner without any human intervention and specifically in computer technology.

As shown in FIG. 1 the RNNT architecture 100 includes a prediction network 110, an acoustic feature encoder 120, a joint network 130, and a softmax module 140. This architecture is further augmented with a perturbation generator 150 that generates a perturbation in the input to the prediction network 110. To further demonstrate the improvements made by the augmentation of the architecture to include the perturbation generator 150, it is first helpful to understand the operation of the other elements 110-140 of the RNNT architecture 100.

It is assumed for purposes of illustration that the RNNT architecture 100 operates on a sequence of acoustic data to generate an output sequence comprising a text representation of the acoustic data. The acoustic data may be obtained, for example, from a microphone or other acoustic sensor device, or may be obtained from another source that gathers the acoustic data from a microphone or other acoustic sensor type device.

To explain the operation of the elements 110-140, let $x=(x_1; x_2; \ldots; x_T)$ be the input acoustic sequence of length T where $x_t \in X$ and let $y=(y_1; y_2; \ldots; y_U)$ be the output token sequence of length U where $y_u \in Y$. X and Y are input and output spaces, respectively. An extended output space is defined as $$\bar{Y} = Y \cup \emptyset \qquad (1)$$

where $\emptyset$ represents a null output.

The RNNT architecture 100 evaluates the conditional distribution of the output sequence given the input sequence:

$$Pr(y \in Y^*|x) = \sum_{\alpha \in \beta^{-1}(y)} Pr(\alpha|x) \qquad (2)$$

where $\alpha \in \bar{Y}^*$ are alignments of acoustic sequence x against the token sequence y with the null output symbol $\emptyset$ and $\beta$: $\bar{Y}^* \to Y^*$ is the function that removes null symbols from the alignments.

The acoustic features $x_t$ are embedded in a latent space by the acoustic feature encoder 120, i.e., a vector space spanned by latent variables which are variables not directly observable but which are sufficient to describe the data, which may be, for example, a bi-directional long short-term memory (LSTM) network, sometimes referred to as a transcription network T $$f_t = T(x_{1:T}, t) \qquad (3)$$

The label tokens $y_u$ are embedded in a latent space by a unidirectional LSTM network, referred to as the prediction network P 110:

$$g_u = P(y_{[1:u-1]}, u) \qquad (4)$$

Given the acoustic embedding $f_t$ and the label token embedding $g_u$, the predictive output probability at (t; u) is generated by projecting these outputs to a joint latent space by joint network 130 which is then normalized by the softmax module 140. That is, the outputs of the prediction network 110 and acoustic feature encoder 120 are input to the joint network 130 which operates along with softmax module 140 to generate the predictive output probability of the RNNT in accordance with the equation:

$$p(\cdot|t,u) = \text{softmax}[W^{out} \tan h(W^{enc}f_t \odot W^{pred}g_u + b)] \qquad (5)$$

In equation (5), matrices $W^{enc}$ and $W^{pred}$ are linear transforms that project the acoustic embedding $f_t$ and the label token embedding $g_u$ into the same joint latent space where element-wise multiplication is performed and a hyperbolic tangent (tan h) nonlinearity is applied. The result of the joint network 130 is projected to the output space by a linear transform $W^{out}$ and normalized by a softmax function, producing a predictive probability estimate P(y|t, u). Thus, with regard to equation (5), the joint network 130 performs the operation represented in the brackets, while the softmax module 140 performs the softmax operation that normalizes the output of the joint network 130 to a legitimate probability distribution.

The parameters of RNNT θ are optimized by the machine learning training module 160 using the maximum likelihood criterion:

$$\theta^* = \underset{\theta}{\mathrm{argmax}} \log Pr(y{:}x; \theta) \quad (6)$$

The conditional likelihood in equation (2) over all possible alignments is evaluated using a forward-backward module 162 of the machine learning training module 160 using a forward-backward function:

$$Pr(y \in y^*|x) = \sum_{(t,u):t+u=n} \alpha(t, u)\beta(t, u) \quad (7)$$

∀n:1≤n≤U+T where α(t, u) and β(t, u) are forward and backward variables that can be computed recursively on the time-label lattice, where the horizontal grids represent time while the vertical grids represent label tokens and the alignment is a path through these grids from bottom left to the top right, as previously discussed above. Optimization performed by the machine learning training module 160 may be based on stochastic gradient descent or its variants with back-propagation. Once the RNNT 100 is trained, during inference stage operation, decoding may be carried out on an input speech sequence input to the RNNT 100 for each time stamp where the trained RNNT 100 may predict a probability distribution of all the text classes and, based on a global search or other suitable algorithm for selecting a best output given target variables like maximum probability or next output character, a prediction is generated.

A prediction network, in architectures that do not include the perturbation generator 150 of the illustrative embodiments, is always fed with the ground truth label token sequences. That is, in equation (4) above, the LSTM P always uses the previous ground truth token history $y_{[1:n-1]}$ to recurrently encode the current token $y_u$. However, in decoding, the input sequence to the prediction network, $\hat{y}=\{\hat{y}_1; \hat{y}_2; \ldots; \hat{y}_U\}$, is composed of token hypotheses. As a result, the prediction network has to encode the current token $\hat{y}_u$ using the history $\hat{y}_{[1:n-1]}$ which may contain errors. This discrepancy between the training and decoding will incur the mismatch of the output probability in equation (5) and consequently affect the probability distribution over the lattice.

With the mechanisms of the illustrative embodiments the perturbation generator 150 introduces label-preserving perturbations (e.g., even though perturbed label inputs are input to the prediction network 110, the original labels are still used at the output of the softmax module 140) to the input label token sequences of the prediction network 110. Specifically, the perturbation generator 150 introduces a perturbation of the following type to inject errors into the ground truth sequence:

$$\sigma(y) \rightarrow \tilde{y} \quad (8)$$

The resulting token sequence $\tilde{y}$ perturbs the token embedding and also alters the alignment a in equation (2)

$$Pr(y|\tilde{y}, x) = \sum_{\alpha \in \beta^{-1}(\tilde{y})} Pr(\alpha|x) \quad (9)$$

In the meantime, since it is label preserving, the loss in equation (6) is still optimized under the likelihood of ground truth y.

The perturbation generator 150 may utilize one or more perturbation generation techniques and corresponding logic to generate the perturbations injected into the training data that is used to train the prediction network 110. Examples of these perturbation techniques may include, for example, scheduled sampling, Bernoulli trial, etc., among others. The following will first describe an example randomized error based perturbation generation followed by a description of an example of scheduled sampling based perturbation generation. It should be appreciated that these are only examples and any suitable perturbation generation technique may be used to inject perturbations into the training data.

With regard to an example randomized error based perturbation generation, given an input token sequence y, the randomized error based perturbation technique randomly corrupts a number of tokens in y. First, the number of tokens to be corrupted, ˆn, is sampled according to the following distribution:

$$p(n) = \frac{e^{-\frac{n}{\tau}}}{\sum_{n'=0}^{|y|} e^{-\frac{n'}{\tau}}} \quad (10)$$

where τ is a temperature parameter controlling the "flatness" of the distribution. The "temperature" is a parameter used to control the flatness of the distribution where if the temperature is high, the probability distribution is more flat and sampling is inclined to equal probabilities. If the temperature parameter has a relatively lower value, the probability is more concentrated so sampling tends to be skewed to some particular choice. In the context of the illustrative embodiments, the temperature parameter controls the error pattern of the perturbed label sequence that is input to the prediction network 110 from the perturbation generator 150.

Define a Bernoulli random variable as follows:

$$\gamma\text{-Bernoulli}(\hat{n}=|y|) \quad (11)$$

which is fixed for each token sequence y. For each token $y_u$ in y, u∈{1, 2, . . . , U}:

$$\tilde{y}_u = \begin{cases} v \in Y, v \neq y_u, & \gamma = 1 \\ y_u, & \gamma = 0 \end{cases} \quad (12)$$

The randomized error perturbation technique introduces uncertainty to the ground truth sequence in a random fashion, which does not consider the history of tokens when making the perturbation. In decoding, every token is a predictive outcome of the previous history of tokens in the input, and the prediction network 110 implicitly learns the dependency similar to a language model, i.e. a probability model that predicts the next text token based on the history of observed token sequence, e.g., if the language model observes two words "He is" then it will predict that the next likely work could be "tall", "short", "thin", but not likely "square", "circle", or the like.

With scheduled sampling as an example of a perturbation generation technique, in order for the machine learning training to be closer to the correct decoding (inference), i.e., with reduced exposure bias, a token language model (LM) may be used to perturb the next token given a token history of the input data sequence. First, an LSTM LM $\tilde{P}(z_u|z_{[1:u-1]})$ is trained on the token sequences of the training data set. Suppose y is the ground truth token sequence and ỹ the perturbed token sequence. Define a Bernoulli random variable as follows:

$$\gamma \sim \text{Bernoulli}(p) \quad (13)$$

where p is a teacher forcing probability, e.g., a percentage of time that the ground truth labels are utilized, e.g., if p=0.7, 70% of the time the ground truth labels are utilized and 30% of the time the perturbed label tokens are utilized. To make the prediction of the next token in the perturbed sequence, the perturbation mechanisms either use the ground truth or samples from the token LM with probability p:

$$\tilde{y}_u = \begin{cases} y_u, & \gamma = 1 \\ z_u, \sim \tilde{P}(z_u \mid \sim y_{[1:u-1]}), & \gamma = 0 \end{cases} \quad (14)$$

When sampling from $\tilde{P}(z_u|z_{[1:u-1]})$, the predicted next token is uniformly selected from the top k token candidates given the history $\tilde{y}_{[1:u-1]}$, where k is a hyper-parameter. When k=1, the most likely token given the history is always chosen.

These are examples of techniques that may be implemented by the perturbation generator 150 to introduce or inject perturbations into the ground truth labels input to the prediction network 110 of the RNNT architecture 100 to train the prediction network 110 to generate correct prediction results even in the presence of errorful inputs. Since the prediction network 110 operates on perturbed ground truth labels, but the output of the RNNT architecture 100 is used by the machine learning training engine 160 based on the non-perturbed ground truth labels, and modifies operational parameters of the prediction network 110 using a machine learning operation and forward-backward functionality to adjust the performance of the prediction network 110 to generate more accurate prediction outputs even in the presence of errorful input labels.

Figure 2:
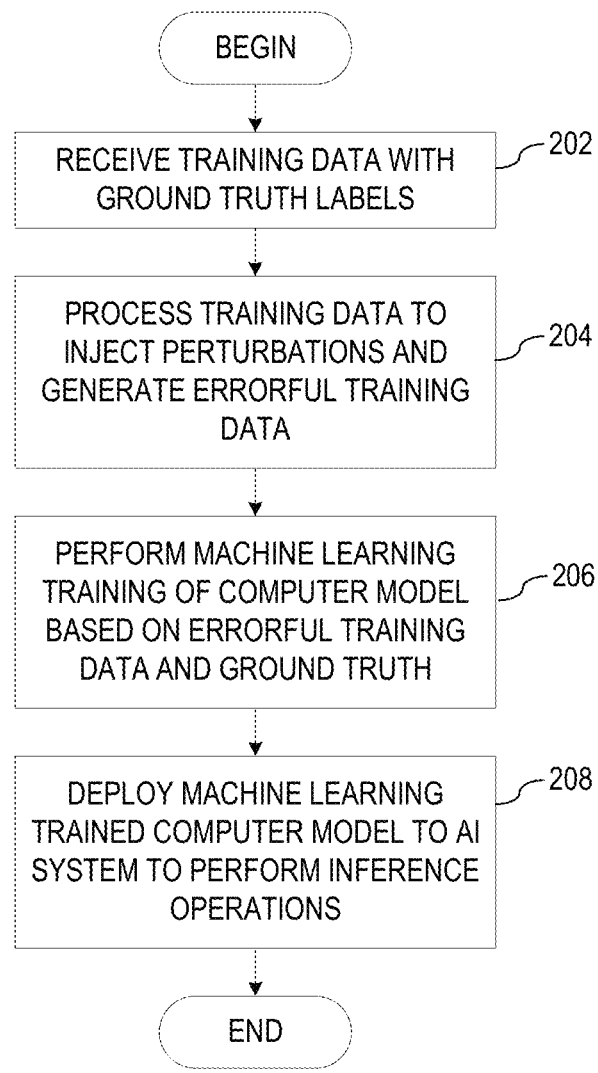
FIG. 2 is a flowchart outlining an example operation for performing perturbation based machine learning training of a computer model in accordance with one illustrative embodiment.

FIG. 2 is a flowchart outlining an example operation for performing perturbation based machine learning training of a computer model in accordance with one illustrative embodiment. As shown in FIG. 2, the operation starts with the receiving of training data with ground truth labels by the perturbation generator (step 210). The perturbation generator processes the training data to inject perturbations and generate errorful training data, e.g., injects errors or corruption into the ground truth labels using a suitable data corruption technique (step 220). This errorful training data is then input to the computer model, e.g., RNNT, to generate prediction results which are then compared to the original, unperturbed, ground truth training data and the computer model is trained through a machine learning process that iteratively adjusts operational parameters of the computer model based on comparisons of the computer model's output to the unperturbed ground truth training data until a loss function or error in the output of the computer model reaches an acceptable threshold or a predetermined number of iterations, or epochs, have been executed (step 230). The machine learning trained computer model is then deployed to the artificial intelligence (AI) computer system to perform its inference operations that may serve as a basis for further AI operations within the AI computer system (step 240). The operation then terminates.

Figure 3:
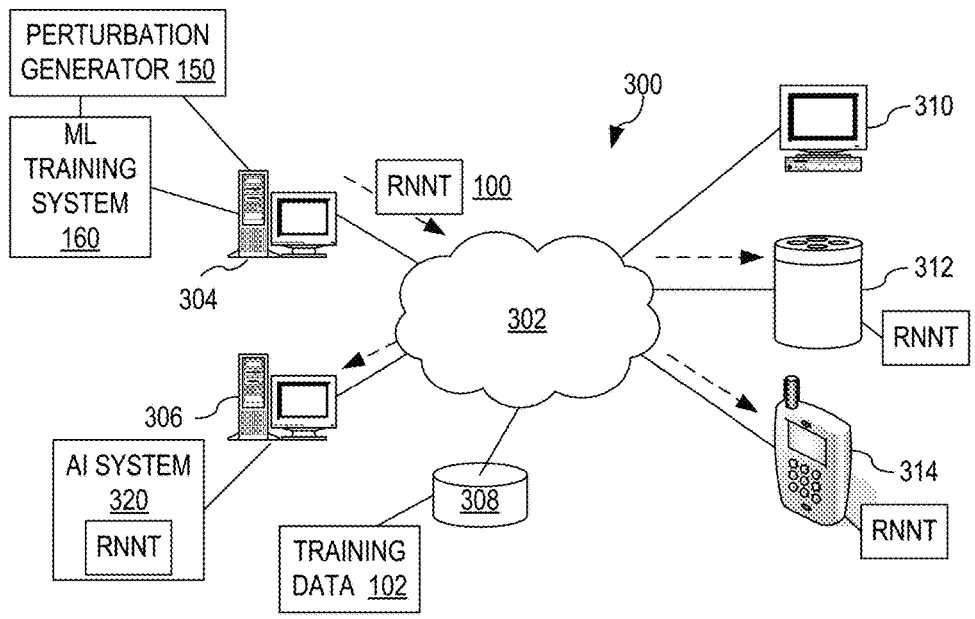
FIG. 3 is an example diagram of a distributed data processing system in which aspects of the illustrative embodiments may be implemented.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., server 304, may be specifically configured to implement a perturbation generator 150 and machine learning training system 160 operating to train a RNNT 100 that, once trained using injected perturbations into the training data in accordance with one or more of the illustrative embodiments, may be deployed to various client computing device 312, 314, and/or AI systems 320. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, with regard to one or more illustrative embodiments, the implementation of the mechanisms of the illustrative embodiments improves the functionality of the computing device and provides a useful and concrete result that facilitates an improved machine learning training of computer models at least by introducing or injecting perturbations into the training data used by prediction networks of the computer models, while performing the machine learning training operations based on the original unperturbed ground truth training data.

Figure 4:
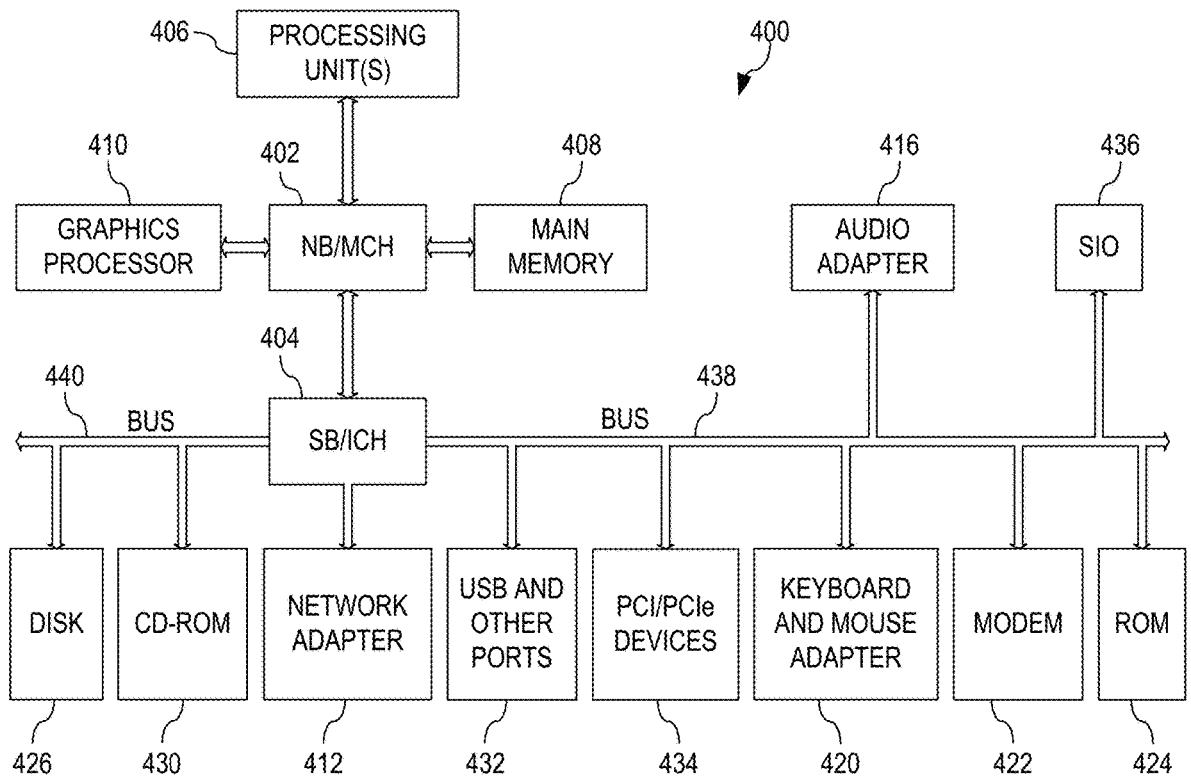
FIG. 4 is an example block diagram of a computing device in which aspects of the illustrative embodiments may be implemented.

As noted above, the mechanisms of the illustrative embodiments utilize specifically configured computing devices, or data processing systems, to perform the operations for generating and injecting perturbations into ground truth training data and performing machine learning training on the computer model based on the perturbed ground truth training data but using unperturbed training data as a basis for evaluation of the performance of the computer model during training. These computing devices, or data processing systems, may comprise various hardware elements which are specifically configured, either through hardware configuration, software configuration, or a combination of hardware and software configuration, to implement one or more of the systems/subsystems described herein. FIG. 4 is a block diagram of just one example data processing system in which aspects of the illustrative embodiments may be implemented. Data processing system 400 is an example of a computer, such as server 304 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p° computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the perturbation generator, machine learning training engine, and computer models.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing machine learning training of a computer model, the method comprising: generating, by a perturbation generator, a modified training data comprising perturbations injected into original training data by the perturbation generator, where the original training data comprises data samples with corresponding original ground truth labels, and where the perturbations cause a data corruption of the original training data at least by modifying one or more of the original ground truth labels, associated with one or more selected data samples of the original training data to generate one or more perturbed ground truth labels, wherein the modified training data comprises the data samples and corresponding ground truth labels, wherein the corresponding ground truth labels comprise the one or more perturbed ground truth labels for the one or more selected data samples, and the original ground truth labels for data samples that are not in the one or more selected data samples; inputting the modified training data into a prediction network of the computer model; processing the modified training data through the prediction network to generate a prediction output, wherein the prediction network processes, for the one or more selected data samples, the one or more perturbed ground truth labels when generating the prediction output; executing machine learning training of the prediction network based on the prediction output and the original training data comprising the original ground truth labels to generate a trained prediction network of a trained computer model, wherein a loss function implemented in the machine learning training operates based on the original ground truth labels; and deploying the trained computer model to an artificial intelligence computing system for performance of an inference operation.

2. The method of claim 1, wherein the computer model is a sequence-to-sequence computer model that receives as an input a first sequence of input data and outputs a second sequence of output data different from the first sequence.

3. The method of claim 2, wherein the sequence-to-sequence computer model is a recurrent neural network transducer.

4. The method of claim 2, wherein the sequence-to-sequence computer model is an automatic speech recognition (ASR) computer model in which the first sequence of input data comprises acoustic input data and the second sequence of output data comprises a sequence of textual content corresponding to words recognized by the ASR computer model in the acoustic input data.

5. The method of claim 2, wherein the sequence-to-sequence computer model is a recurrent neural network transducer comprising the prediction network, an encoder, and a joint network that combines the outputs of the prediction network and the encoder.

6. The method of claim 1, wherein the computer model further comprises an acoustic feature encoder that receives, as input, acoustic data of the original training data, and wherein the prediction output from the prediction network is combined with an acoustic feature encoding output by the acoustic feature encoder to generate an output of the computer model that is used by the machine learning training to train the prediction network.

7. The method of claim 6, wherein the perturbations are label preserving perturbations which affect an alignment of the acoustic feature encoding with the prediction output of the prediction network but which provides optimization of a loss function during the machine learning training.

8. The method of claim 1, wherein the original training data comprises speech data as the data samples and original ground truth label data indicating words spoken in the speech data, and wherein the perturbations modify the indicated words spoken in the speech data to introduce random modifications of the indications of the words spoken in the speech data, to thereby emulate errorful input data.

9. The method of claim 1, wherein the perturbation generator generates the perturbations based on at one of a randomized error perturbation operation, a scheduled sampling operation, or a Bernoulli trial operation.

10. The method of claim 1, wherein the perturbations are random modifications to the original ground truth labels based on a distribution of the original ground truth labels and a temperature parameter to generate the perturbed ground truth labels to emulate errors in input to the prediction network.

11. A computer program product comprising a non-transitory computer readable medium having a computer readable program stored therein, wherein the computer readable program, when executed on a computing device, causes the computing device to: generate, by a perturbation generator, a modified training data comprising perturbations injected into original training data by the perturbation generator, where the original training data comprises data samples with corresponding original ground truth labels, and where the perturbations cause a data corruption of the original training data at least by modifying one or more of the original ground truth labels, associated with one or more selected data samples of the original training data to generate one or more perturbed ground truth labels, wherein the modified training data comprises the data samples and corresponding ground truth labels, wherein the corresponding ground truth labels comprise the one or more perturbed ground truth labels for the one or more selected data samples, and the original ground truth labels for data samples that are not in the one or more selected data samples; input the modified training data into a prediction network of the computer model; process the modified training data through the prediction network to generate a prediction output, wherein the prediction network processes, for the one or more selected data samples, the one or more perturbed ground truth labels when generating the prediction output; execute machine learning training of the prediction network based on the prediction output and the original training data comprising the original ground truth labels to generate a trained prediction network of a trained computer model, wherein a loss function implemented in the machine learning training operates based on the original ground truth labels; and deploy the trained computer model to an artificial intelligence computing system for performance of an inference operation.

12. The computer program product of claim 11, wherein the computer model is a sequence-to-sequence computer model that receives as an input a first sequence of input data and outputs a second sequence of output data different from the first sequence.

13. The computer program product of claim 12, wherein the sequence-to-sequence computer model is a recurrent neural network transducer.

14. The computer program product of claim 12, wherein the sequence-to-sequence computer model is an automatic speech recognition (ASR) computer model in which the first sequence of input data comprises acoustic input data and the second sequence of output data comprises a sequence of textual content corresponding to words recognized by the ASR computer model in the acoustic input data.

15. The computer program product of claim 12, wherein the sequence-to-sequence computer model is a recurrent neural network transducer comprising the prediction network, an encoder, and a joint network that combines the outputs of the prediction network and the encoder.

16. The computer program product of claim 11, wherein the computer model further comprises an acoustic feature encoder that receives, as input, acoustic data of the original training data, and wherein the prediction output from the prediction network is combined with an acoustic feature encoding output by the acoustic feature encoder to generate an output of the computer model that is used by the machine learning training to train the prediction network.

17. The computer program product of claim 16, wherein the perturbations are label preserving perturbations which affect an alignment of the acoustic feature encoding with the prediction output of the prediction network but which provides optimization of a loss function during the machine learning training.

18. The computer program product of claim 11, wherein the original training data comprises speech data as the data samples and original ground truth label data indicating words spoken in the speech data, and wherein the perturbations modify the indicated words spoken in the speech data to introduce random modifications of the indications of the words spoken in the speech data, to thereby emulate errorful input data.

19. The computer program product of claim 11, wherein the perturbations are random modifications to the original ground truth labels based on a distribution of the original ground truth labels and a temperature parameter to generate the perturbed ground truth labels to emulate errors in input to the prediction network.

20. An apparatus comprising: a processor; and a memory coupled to the processor, wherein the memory comprises instructions which, when executed by the processor, cause the processor to: generate, by a perturbation generator, a modified training data comprising perturbations injected into original training data by the perturbation generator, where the original training data comprises data samples with corresponding original ground truth labels, and where the perturbations cause a data corruption of the original training data at least by modifying one or more of the original ground truth labels, associated with one or more selected data samples of the original training data to generate one or more perturbed ground truth labels, wherein the modified training data comprises the data samples and corresponding ground truth labels, wherein the corresponding ground truth labels comprise the one or more perturbed ground truth labels for the one or more selected data samples, and the original ground truth labels for data samples that are not in the one or more selected data samples; input the modified training data into a prediction network of the computer model; process the modified training data through the prediction network to generate a prediction output, wherein the prediction network processes, for the one or more selected data samples, the one or more perturbed ground truth labels when generating the prediction output; execute machine learning training of the prediction network based on the prediction output and the original training data comprising the original ground truth labels to generate a trained prediction network of a trained computer model, wherein a loss function implemented in the machine learning training operates based on the original ground truth labels; and deploy the trained computer model to an artificial intelligence computing system for performance of an inference operation.

* * * * *